United States Patent
Franzaroli

(10) Patent No.: US 6,715,265 B2
(45) Date of Patent: Apr. 6, 2004

(54) METHOD AND A PLANT FOR PRODUCING ARTICLES, IN PARTICULAR PAPER ROLLS OR THE LIKE, AND A CONVEYING APPARATUS USABLE IN SAID PLANT

(75) Inventor: Massimo Franzaroli, Bologna (IT)

(73) Assignee: Pulsar S.R.L., Castel Maggiore (IT)

( * ) Notice: Subject to any disclaimer, the term of this patent is extended or adjusted under 35 U.S.C. 154(b) by 179 days.

(21) Appl. No.: 09/791,781

(22) Filed: Feb. 26, 2001

(65) Prior Publication Data

US 2001/0042359 A1 Nov. 22, 2001

(30) Foreign Application Priority Data

Feb. 25, 2000 (IT) .................................. BO2000A000094

(51) Int. Cl.⁷ .......................... B65B 63/00; B65B 11/00; B65B 57/16; G06F 16/00
(52) U.S. Cl. .............................. 53/435; 53/466; 53/520; 53/55; 700/100
(58) Field of Search .......................... 53/513, 396, 522, 53/430, 55, 435, 53, 466, 54, 520, 541; 198/398, 347; 414/270, 271, 273; 700/95, 97, 99, 100, 101, 102, 112, 127, 106, 108

(56) References Cited

U.S. PATENT DOCUMENTS

| | | | | |
|---|---|---|---|---|
| 1,998,066 A | * | 4/1935 | Anderson ..................... 193/36 |
| 4,124,967 A | * | 11/1978 | Beer et al. ..................... 53/250 |
| 4,590,743 A | * | 5/1986 | Hardage ..................... 53/446 |
| 4,696,615 A | * | 9/1987 | Ettischer et al. .......... 414/795.8 |
| 4,868,759 A | * | 9/1989 | Ross et al. ..................... 53/51 |
| 4,924,657 A | * | 5/1990 | Berti et al. ..................... 53/450 |
| 4,939,888 A | | 7/1990 | Katz et al. |
| 5,018,336 A | * | 5/1991 | Mengotti et al. ...... 198/370.08 |
| 5,078,255 A | | 1/1992 | Haley |
| 5,089,970 A | * | 2/1992 | Lee et al. ..................... 700/96 |
| 5,175,981 A | * | 1/1993 | Gombos et al. ............. 100/218 |
| 5,229,948 A | * | 7/1993 | Wei et al. ..................... 700/99 |
| 5,433,063 A | * | 7/1995 | Kovacs et al. ............. 53/374.5 |
| 5,689,942 A | | 11/1997 | Suga |
| 5,706,627 A | * | 1/1998 | Kirka et al. ................... 493/18 |
| 5,809,738 A | * | 9/1998 | Stephens et al. .............. 53/154 |
| 5,864,484 A | * | 1/1999 | Harding ...................... 493/464 |
| 5,893,259 A | | 4/1999 | Posge |
| 5,996,316 A | * | 12/1999 | Kirschner ..................... 53/443 |
| 6,021,890 A | * | 2/2000 | Focke et al. ................. 206/391 |
| 6,317,643 B1 | * | 11/2001 | Dmochowski .............. 700/100 |
| 6,374,580 B1 | * | 4/2002 | Kujubu et al. ............. 53/376.2 |
| 6,411,859 B1 | * | 6/2002 | Conboy et al. ............. 700/101 |

FOREIGN PATENT DOCUMENTS

| | | | |
|---|---|---|---|
| EP | 0 403 079 | 12/1990 | |
| EP | 0 614 814 | 9/1994 | |
| EP | 0 654 408 | 5/1995 | |
| EP | 0 654 429 A1 | 5/1995 | |
| EP | 0 825 502 | 2/1998 | |
| WO | 00/05138 | 2/2000 | |
| WO | WO 00/05138 | * 2/2000 | ........... B65B/35/44 |

* cited by examiner

Primary Examiner—Rinaldi I. Rada
Assistant Examiner—Paul Durand
(74) Attorney, Agent, or Firm—Young & Thompson

(57) ABSTRACT

A method for defining the operation of a plant for producing, conveying and packaging articles. The articles include rolls, such as rolls of paper material and the like. The plant includes the following operative sections: at least an apparatus for forming articles positioned upstream, at least a machine for packaging the articles in respective packs positioned downstream, and an apparatus for conveying the articles which is able to transfer the articles between the forming apparatus and the packaging apparatus. The method and the plant provide that, through a central control unit of the plant, starting from predefined setting data, operating parameters of the sections of the plant are determined.

14 Claims, 5 Drawing Sheets

METHOD AND A PLANT FOR PRODUCING ARTICLES, IN PARTICULAR PAPER ROLLS OR THE LIKE, AND A CONVEYING APPARATUS USABLE IN SAID PLANT

FIELD OF THE INVENTION

The present invention relates to a method of operation of a plant for producing, conveying and packaging articles, in particular articles in the form of rolls.

The present invention also relates to a plant for producing, conveying and packaging said articles, and to an apparatus usable in said plant.

BACKGROUND OF THE INVENTION

In particular, the present invention relates to a plant for producing, conveying and packaging rolls of strip-like material wound on a support core, for instance in the form of rolls of paper material or the like destined to domestic or similar use, wound on a cardboard core tube. Such rolls are preferably rolls of toilet paper, kitchen paper, aluminum foil and other materials destined to personal, domestic, industrial use or the like.

In general, known plants for producing and packaging said rolls comprise, upstream, an apparatus for forming the rolls having a shearing machine that cuts said rolls from respective logs or coils which are cut simultaneously in a predefined number, for instance equal to 2, 3 or 4, and sent onto parallel conveying lines towards respective packaging machines.

Known machines for forming the rolls further comprise a series of operative sections which produce said coils or logs, wherefrom said rolls are cut off, starting from a main coil for feeding the paper material or the like. Said feeding coil is large in size and it is obtained directly from the plant that produces this material, generally from the paper mill. Known forming machines thus comprise an initial coil loading section, which generally supports at least a first and a second said feeding coils, to allow for a continuous feeding of the roll producing apparatus, and which unwinds the paper strip from the feeding coil and transfers it to a successive section in which the paper is embossed to increase the volume of said paper strip. Downstream of the embossing section, several layers of said paper may be coupled and a re-coiling section is present which receives the core tubes from an appropriate section dedicated to their forming, whereon it glues and winds a quantity of paper of a diameter corresponding to that of the rolls to be produced, obtaining the logs or elongated coils to be cut into rolls. Such logs or elongated coils are then sent to a successive section for storing said logs or elongated coils and, thence, to the section for cutting the rolls off from said logs.

In known plants, the upstream shearing machines performs the transverse cutting of said rolls from logs or elongated coils, whose length is a multiple of the length of the individual roll to be cut, and one or more downstream packaging machines package said rolls in appropriate packs, made with a coating film of plastic or paper material, which contain a pre-selected number of said articles, ordered in rows which may be arranged in multiple layers.

Said packaging machines provide a certain number of types of packages of articles, each having predetermined dimensions and being composed by a pre-defined number of rolls, arranged according to a pre-set configuration. Moreover, each type of pack is also distinguished in relation to the type of roll (geometric dimensions) and type of paper used to form said rolls.

Each customer of the plant who purchases the packaged rolls generally requires a respective type of package. Plants for producing said rolls provide a series of successive production runs, possibly destined to different customers, in which packages and corresponding rolls with mutually different characteristics are manufactured.

Known plants normally make use of a shearing machine with high productive rates, whereto is associated more than one machine for packaging the rolls, each generally operating at a lower speed than the working speed of the shearing machines.

In known plants, the roll forming and packaging machines generally differ from each other, are produced by different manufacturers and thus have wholly differentiated operating performance.

Plants where the material in rolls is produced and packaged generally use machines made by different manufacturers. This occurs, for instance, because said machines were acquired at different times, or because said machines are selected according to specific advantageous characteristics which they present.

In plants according to the prior art and in particular in plants that employ machines produced by different manufacturers, however, there is a problem with coordinating the operation between the roll forming machines and the packaging machines, as well as between the packaging machines and the conveyor belts connecting them, which causes the actual yield of the production plants to be quite low and does not allow sufficiently to exploit the high working rate potential of the aforesaid known machines.

Currently, in the present field, packaging machines present their own control unit or PLC, which autonomously controls, through an appropriate software program, the extremely complex and articulated operation of this type of machine. In particular, this PLC allows to set, among other parameters, the working rate of said machine, which is normally set equal to the maximum working rate that can be obtained from said machines, for the purpose of exploiting its potential to the utmost.

In such traditional plants, the settings of the operation, in particular of the working rate, of the different cutting and packaging machines and of the conveying apparatus, for instance every time the operation must be adapted to the changed format of the roll packs to be produced—i.e. to the number and disposition of the articles to be packaged in a single pack—are conducted independently for each individual machine, by assigned operators, who make use of respective keyboards for entering data into the respective PLC's or local control units of the aforesaid machines.

Such a way of proceeding, which entails an adjustment of the system that could be defined of the "manual" kind, is, however, quite unproductive. It is not at all easy for the operators, who generally do not have a very high education level, to obtain a proper adjustment of the system, especially when it is necessary to manage several format changes and the operators of the various machines have difficulties communicating with each other. This also takes place in consideration of the fact that the plants present considerable dimensions and there is an objective difficulty in communicating, also because of the noise in the plants, and in moving between the densely spaced lines for conveying the articles.

Such a local adjustment of the operation of each individual machine in the system usually leads to an incorrect operation of the system. Known plants, to overcome these less than correct adjustments of the system, make use of normal automatic controls for stopping system operation, which are activated through signals provided by optical sensors of maximum and minimum load in correspondence with the working machines. It may occur, when said packaging machines are fed an excessive number of articles, an automatic signal is emitted to command the upstream cutting machine to stop, while a corresponding signal to stop the packaging machine itself is emitted when said machines are fed an insufficient quantity of articles. In known plants, therefore, a fluctuating type of operation takes place, with working phases alternating with idle phases, of the different machines in the plant. Therefore, even in the presence of machines that are able to operate at high speeds, one actually obtains rather modest production rates, which frustrate the heavy financial investment needed to purchase such high speed machines.

Moreover, this way of operating, which ultimately entails numerous stops of the upstream shearing or forming machine, as well as of the packaging machine, is quite harmful to the duration of their working life. The components of said machines are subjected to continuous accelerations and decelerations needed to bring them from the operating condition to the stopped condition, which induce stresses that, in the long term, lead to failures and wear of the main mechanical parts of the machines. The forming shearing machines comprise, for instance, an ample circular blade which, with a single movement in a plane transverse to the elongated logs, simultaneously cuts multiple rolls, in particular a number of rolls equal to the number of logs fed in correspondence with said cutting blade. The stops, due to emergency causes, of said circular blade, can, over time, damage the actuating mechanism of the blade, with considerable repair costs and production losses due to the machine idle time.

In traditional plants for articles, such as said rolls, the risk that the articles may be upset is high and the consequent plant stop causes production losses and, over time, the failure and wear of the mechanical parts of the parts employed. The number of upsets that take place is influenced by the velocity of conveyance of the articles and by the format of the rolls. Obviously, for short rolls with large diameters the risk of upsetting is greater. Therefore, making the upstream shearing machine operate at the maximum working rate aggravates the risk of upsetting the articles, at least in relation to certain types of products, such as the aforesaid rolls with reduced length.

It should also be noted that, in known plants, rolls can be damaged, during their transfer, by excessively high conveyance speeds, especially due to the contact of the rolls themselves with the conveying guides.

Also known are plants for forming articles and packaging them in corresponding packs. For instance, the prior document BP-A-0654408, discloses an apparatus for feeding products on a single row from a single manufacturing machine positioned upstream of two packaging machines positioned downstream, in which, to transfer the products from a continuous conveyor belt exiting the machine that manufactures the products to a first and a second conveyor for respective packaging machines, use is made of a translator which alternatively and individually moves the products respectively onto the first and onto the second conveyor of the respective packaging machine.

A central microprocessor unit directly controls the units commanding the respective electric motors for the actuation of the packaging machines. Said central control unit also acts directly on the control boards of the individual electric motors for actuating the production machine and of the electric motor that controls the conveyor exiting the production machine.

As described in document BP-A-0654408, the production machine is made to operate, under normal conditions, at the maximum working rate, whilst the packaging machines are made to operate at a lesser working rate than their respective maximum level.

According to the description provided in document BP-A-0654408, if one of the packaging machine stops operating due to an emergency, the working rate of the still active packaging machine is increased and, simultaneously, the working rate of the production machine is slowed.

Therefore, this is a complete plant destined to be marketed as a whole, not designed to be inserted in existing plants or to co-operate with different machines already present in the production plant.

The operating philosophy whereon the device described in this prior document BP-A-0654408 is based, it is that of obtaining large production runs by making the machine that forms the articles run at its top working rate. This plant has no provision for the initial setting of the working rate of the individual machine according to other operating modes which may vary according to the characteristics of the product to be handled.

SUMMARY OF THE INVENTION

The present invention provides a method of operation of a plant for producing, conveying and packaging articles, in particular rolls, such as rolls of paper material and the like, said plant comprising the following operative sections:

at least an apparatus for forming articles, positioned upstream;

at least an apparatus for packaging said articles, positioned downstream;

and an apparatus for conveying said articles which is able to transfer said articles between said forming apparatus and said packaging machine; wherein, through a central control unit of the plant, starting from predefined setting data, operating parameters of the sections of the plant are determined, which are provided to the local control units of the operative sections.

It is thereby possible to set, extremely rapidly, for instance when changing the formats of the packs to be packaged or of the rolls to be produced, the operation of the operative sections of the plant, without any risk that erroneous settings of the system may be effected.

It is also possible to reduce the number of personnel assigned to operate said machines and the risk of erroneous settings deriving from mistakes by such personnel. The level of specialization required for the personnel can be low.

According to an additional aspect of the present invention, a method of operation of a plant for producing, conveying and packaging articles, in particular rolls, such as rolls of paper material and the like is provided, said plant comprising the following operative sections:

at least an apparatus for forming articles, positioned upstream;

at least a machine for packaging said articles, positioned downstream;

and an apparatus for conveying said articles which is able to transfer said articles between said forming apparatus and said packaging machine; wherein, the type of format to be produced is set;

for each working section, the hypothetical working rate corresponding to the maximum operating rate of the section in relation to said format is determined;

for each working section, the hypothetical working rate is compared to the working rate of the downstream sections that receives the articles therefrom, to determine a critical section defined as that section in which the hypothetical working rate, for that format, is the lowest relative to the corresponding hypothetical working rates of the other sections;

the actual working rates of the plant sections are then determined in such a way that these rates are lower than the respective maximum rates and are not such as to feed or obtain, in correspondence with the critical section, a quantity of articles exceeding the quantity corresponding to the maximum working rate achievable in this section for that format.

This procedure allows to obtain a continuous and constant flow of articles along the line or the lines of the plant. It prevents the formation of jams and accumulations of product articles in correspondence with the critical work section, which has, for that format, the lowest working rate relative to the other sections. Thus, work stoppages due to indications of maximum feeding load to a specific machine of the plant, with the related lost production and wear on the machinery, are minimized. It is also possible, when the critical section—which operates at the lowest rate for that format—is positioned uphill, to prevent the machines positioned downhill, which operate at a higher rate, from eliminating the load of articles being fed thereto causing the minimum load signals to be emitted with the consequent work stoppage.

In a preferred manner, to obtain the maximum yield, it is possible to cause the actual working rates of the sections of the plant to be such as to feed or obtain, in correspondence with the critical section, a quantity of articles equal or substantially equal to the quantity corresponding to the maximum working rate achievable in this critical section for said set format.

According to another aspect of the present invention a method of operation of a plant for producing, conveying and packaging articles, in particular rolls, such as rolls of paper material and the like is provided, said plant comprising the following operative sections:

at least an apparatus for forming articles positioned upstream;

at least a machine for packaging said articles positioned downstream;

and an apparatus for conveying said articles which is able to transfer said articles between said forming apparatus and said packaging machine; wherein:

when a change in an operating parameter of at least one of the section of the plant is detected, in particular when an event occurs which causes the operation of that section to be stopped, the operating status of the other sections of the plant is verified, and a procedure for rearranging the operation of the plant is determined, according to the operating status of the other sections of the plant.

The present procedure allows to decide the best solution for rearranging the operation of the plant according to the actual state of the plant itself. It is thereby possible to exploit the resources of the plant to the utmost, overcoming to the maximum degree the risk that inopportune interruptions of the plant may arise, which entail production losses of non negligible size.

According to yet a further aspect of the present invention, a plant is provided for producing, conveying and packaging articles, in particular articles in the form of rolls, such as rolls of paper material and the like; comprising at least an apparatus for forming articles positioned upstream, which has at least a local control unit comprising processor means operating under the control of a predefined program that governs the operation of said forming machine, in response to corresponding setting data which are provided to said processor means of the forming machine; at least a packaging machine positioned downstream, which is able to package said articles and has at least a respective local control unit comprising processor means operating under the control of a predefined program that governs the operation of said packaging machine in response to corresponding setting data which are provided to said processor means of the packaging machine; and an apparatus for conveying the rolls which is able to transfer said rolls between said forming machine and said packaging machine and which has at least a respective local control unit comprising processor means operating under the control of a predefined program that governs the operation of said conveying apparatus in response to setting data entered into said processor means of the conveying apparatus, wherein a central control unit is provided which has a program for the determination of operating parameters of the plant, which, starting from predefined setting data supplied to said central unit and relating to a desired operation of the plant, provides, for the respective microprocessor means of the local control units, corresponding data for setting the operation of said upstream forming machine, of said downstream packaging machine and of said conveying apparatus.

The present architecture of the "system" for controlling the plant allows to use work machines having a complex operation which is managed directly by the local control units of the individual operative sections. According to the present invention, co-ordination between said operative sections and the conveyance line is obtained by providing a central control unit, presenting a simplified programming aimed at determining data for controlling the individual sections of the plant, which are sent to the respective sections, avoiding the need to take into account the specific and internal operation of the various operative sections. It is therefore possible to coordinate, in a plant for producing rolls, the operation of known machines produced by the most disparate manufacturers, obtaining a desired operation of the plant thus obtained.

It is thereby possible to co-ordinate in extremely short times, for instance on the occasion of the change in the formats of the packs to be packaged or of the rolls to be manufactured, the operation of the upstream operative section and of the downstream operative section, with the apparatus for conveying the articles. Among other advantages, such co-ordination prevents erroneous system settings. Operating stoppages, with the related production losses and machinery wear, are minimized. It is also possible to reduce the number of personnel assigned to such machines and the risks of erroneous settings deriving from mistakes by said personnel.

The present invention is also aimed at a conveying apparatus usable in the present plant.

BRIEF DESCRIPTION OF THE DRAWINGS

The invention, in its technical characteristics and in its different advantageous aspects, shall become more readily apparent from the detailed description that follows, made with reference to the accompanying figures, which represent embodiments provided purely by way of non limiting example, in which.

DESCRIPTION OF THE PREFERRED EMBODIMENTS

Figure 1:
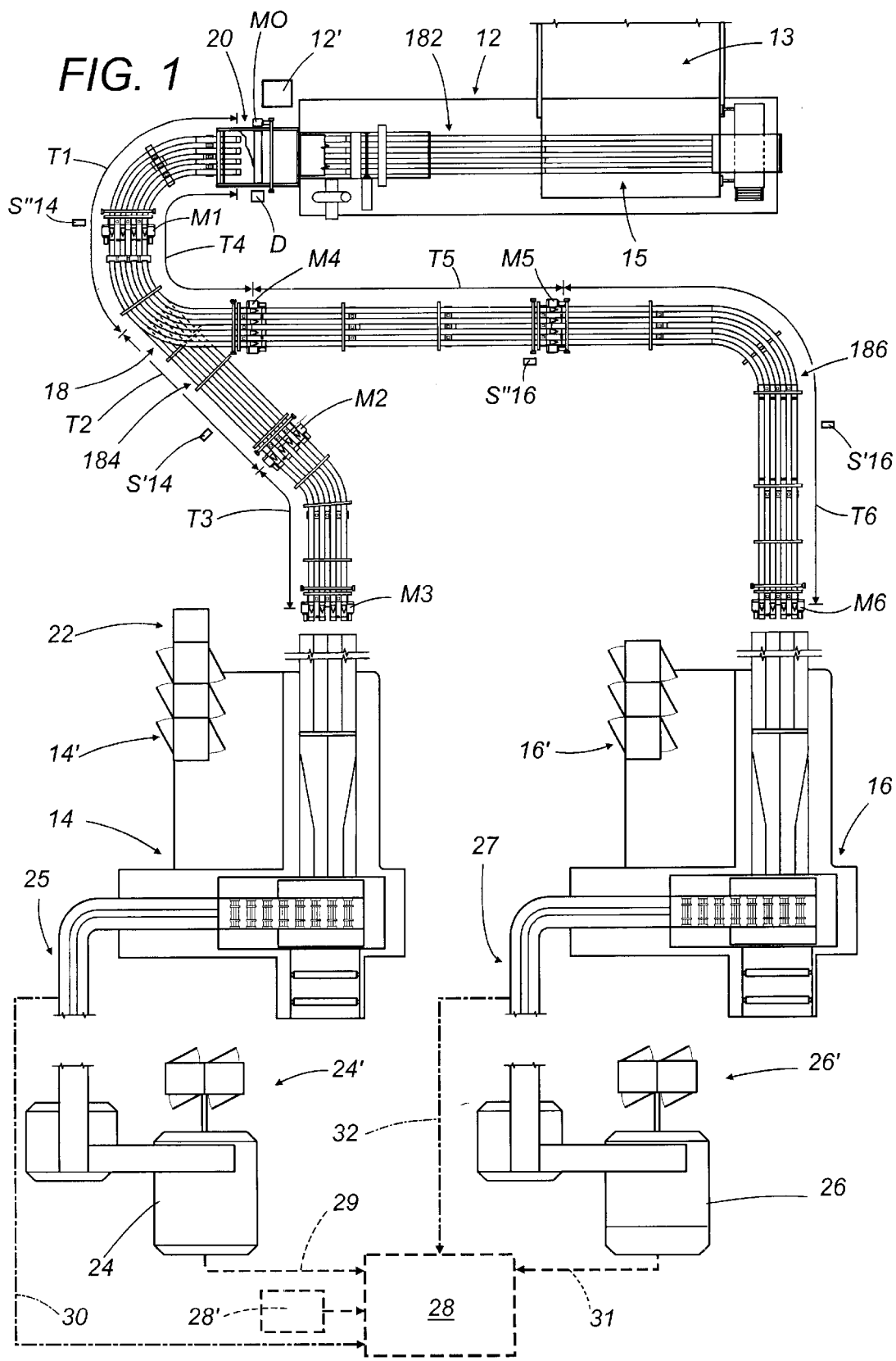
FIG. 1 shows a schematic view of a plant according to a first preferred embodiment of the present invention.

FIG. 1 illustrates a first embodiment of a plant according to the present invention. The plant of this figure comprises a preferred embodiment of apparatus for conveying articles between an operative section positioned upstream 12 and a first and a second operative sections 14, 16 positioned downstream.

In particular, said upstream operative section is a machine 12 for forming rolls of paper material or the like starting from individual logs or elongated coils (not shown in the accompanying figures) and said downstream working sections are machines 14, 16 for packaging said articles into respective packs.

Figure 2B:
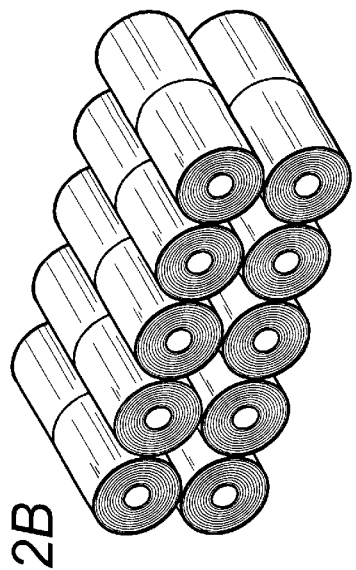
FIGS. 2A and 2B show respective perspective views of two different configurations of rolls defining a respective package format.
Figure 2A:
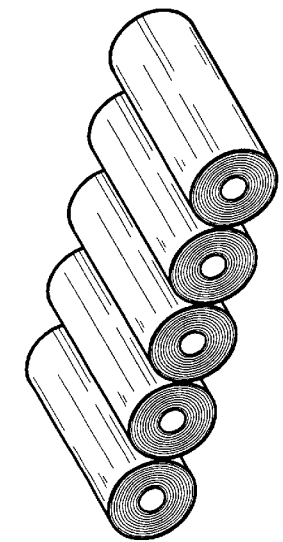

As FIG. 2A shows, the pack could, for instance, be constituted by a longitudinal row of rolls and by a single layer thereof, or, as shown in FIG. 2B, said pack could, for instance, be constituted by two layers of rolls, each of which is in turn subdivided into two respective parallel rows of said rolls. Obviously, with respect to what is shown in FIGS. 2A and 2B, the pack of rolls to be packaged could be constituted by a higher number of rows and layers, as well as by a lower or higher number of rolls for each row of rolls.

Figure 4:
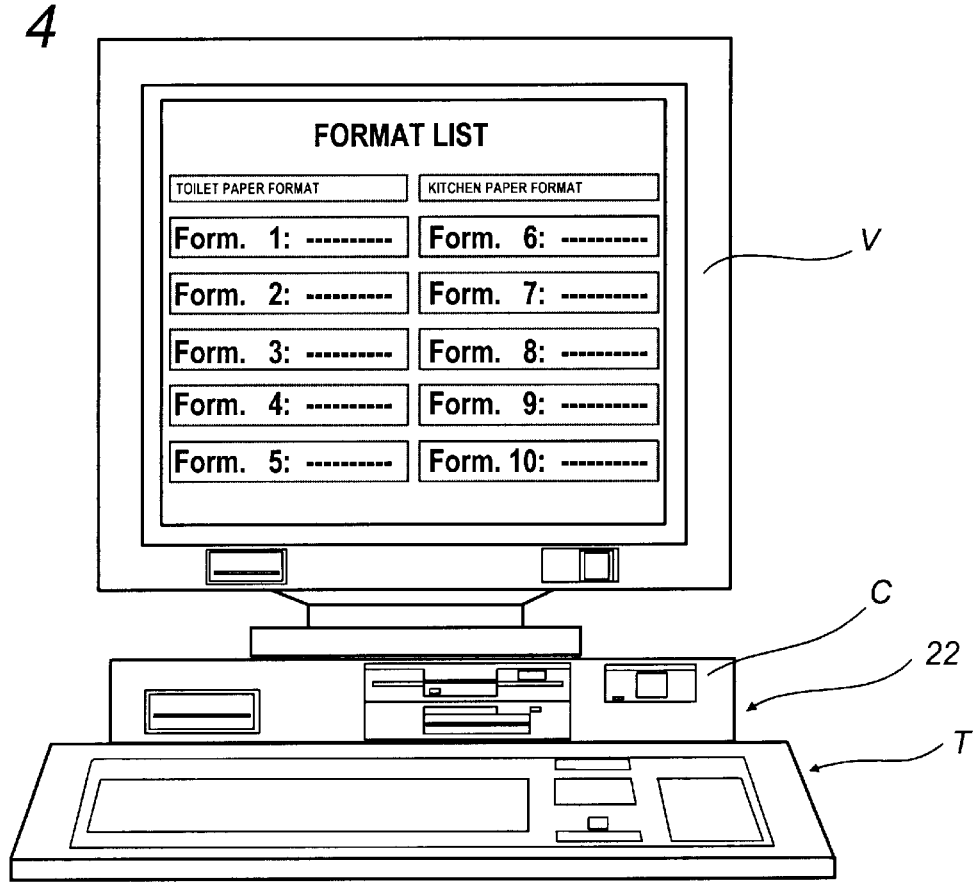
FIG. 4 schematically shows the central control unit of the plant showing a preferred embodiment of a screen relating to a list of the formats available for setting as it appears on the display of the central control unit of the plant according to the present preferred embodiment.

The configuration and number of said rolls, in the respective pack, and the type of roll, which is distinguished by the type of material whereof it is made and by the respective geometric dimensions, define the setting format that the operator chooses among different available formats, as illustrated by the screen shown in the successive FIG. 4, from which one notes that each format is pre-coded and distinguished by a respective identifying sequence of characters.

As shown, the machine for forming the articles comprises a section or machine 12 for shearing said rolls controlled by an appropriate local controlled unit or PLC (or PC).

The forming machine 12 is a machine that, starting from a coil of considerable size, obtained from a paper mill, is able to manufacture—in a coiling section controlled by a dedicated PLC (or PC), different from the PLC that controls the shearing machine 12—an elongated coil, called "log" in the field (not shown in the figure), whose diameter corresponds to the desired one for the rolls to be produced and which must be cut transversely by means of cuts distanced longitudinally by an interval equal to the desired length for individual rolls to be produced.

The coiling machine winds the paper onto a core, normally made of cardboard, in the form of an elongated tube (for instance with a length of 2650 mm), after applying a layer of glue or adhesive which allows the initial adhesion of the paper.

The forming machine 12 presents means for storing or stocking the elongated coils, or logs, which are drawn with reference number 13 in FIG. 1.

The coils or logs are fed in the direction of the outlet of the shearing machine or section 12, whilst a circular cutting blade, movable transversely, cuts the rolls from multiple logs or coils simultaneously.

The present apparatus comprises conveying means, globally indicated with the numeric reference 18, which in turn comprise conveying means 182 that feed said articles coming from said upstream operative section 12, and respective means 184, 186 for conveying said articles to said first and section operative sections positioned downstream 14, 16. Also provided are means 20 for routing said articles from said means for conveying the articles from said upstream operative section 182 to said means for conveying the articles to the downstream operative sections 184, 186.

As shown, said conveying means comprise a plurality of conveying lines, in particular equal to four parallel lines, connecting respective pluralities of lines exiting said upstream operative section with respective pluralities of lines entering said downstream operative section.

Said conveying means 182 are constituted by four rows of parallel conveyor belts which develop according to parallel paths and which are able simultaneously to receive four groups of rolls set side by side, each group being formed by the cut of a respective log or elongated coil of paper material, effected by the upstream shearing machine. The conveying means 184, 186 are constituted by respective four rows of parallel conveyor belts directed towards a respective packaging machine 14, 16.

The conveyor belts 182, 184, 186 can, in turn, be subdivided into multiple successive conveying stages, independently motorized and controlled by the central control unit 22, better described hereafter.

In particular, as shown in FIG. 1, said means 184, 186 for conveying said articles to said first and second operative sections positioned downstream 14, 16, comprise a plurality of longitudinal segments T1, T2, T3 directed to the first operative section 14, and a plurality of longitudinal segments T4, T5, T6 for advancing the articles directed towards the second operative section 16. The segment T1 towards the first section travels at a lower level than the segment T4 for the second section and thus is obscured thereby in FIG. 1.

Each of said conveying segments presents respective motor means of advancement, in the form of respective electric motors, designated with the respective references M1, M2, M3, M4, M5, M6 in FIG. 1, which have a respective velocity control board. The reference M0 in FIG. 1 indicates the motor means, in the form of a respective electric motor, which actuate the conveying segment 182 exiting the shearing machine 12.

The length of the first segment T1 is equal to about 3,000 mm, as is that of the segments T2 and T3. The length of the segments T4, T5, T6 towards the second section is greater than said length. On each conveying segment, therefore, can be housed a whole log of cut rolls, sent grouped one behind the other in substantial mutual contact or slightly distanced from each other.

The switch 20, i.e. the movable conveying means which route the rolls, respectively, towards the first packaging machine 14 or towards the second packaging machine 16, are preferably constituted by four conveyor belts which present a substantially fixed end positioned in correspondence with the terminal end for transferring the upstream conveying belts 182 and a respective movable end able to be moved, by suitable actuation means controlled by the unit 22, respectively, in correspondence with the initial ends for receiving the downstream conveyor belts 184, 186. The present switch could for instance be like the one described in patent application WO 00/05138 filed by the same Applicant.

The reference D schematically indicates, in FIG. 1, said means for actuating the switch into the working position that conveys the articles towards the first section 14, or in the working position that conveys the articles towards the second section 16.

Figure 7:
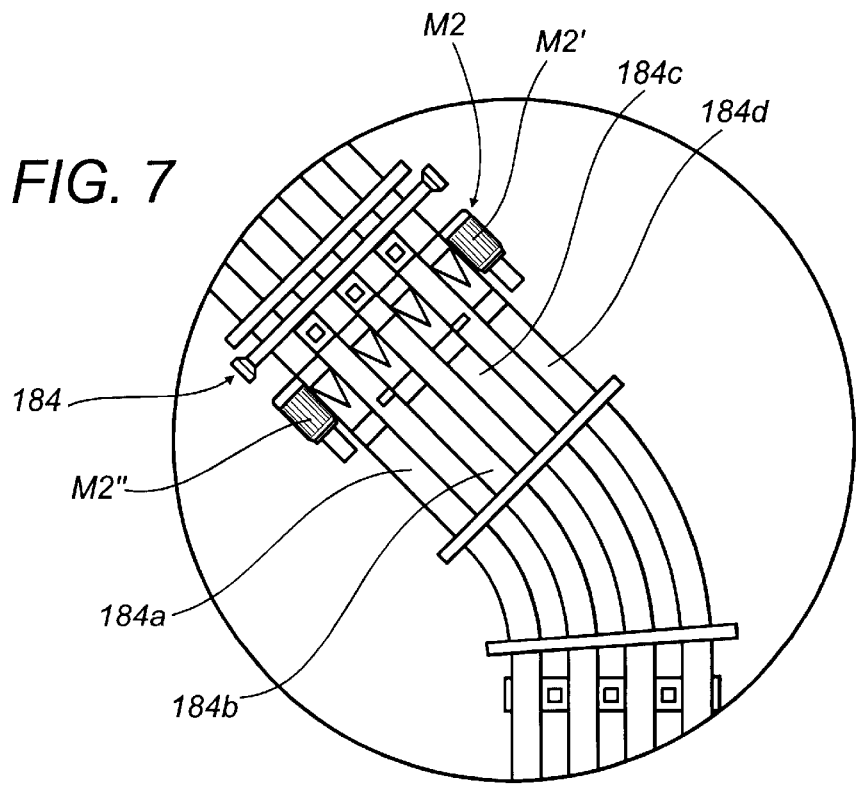
FIG. 7 shows a schematic view of a preferred motorization stage of the present conveying apparatus.

As the detail in FIG. 7 relating to the motor means M2 schematically shows, according to a particular advantageous aspect, the motors for actuating the conveyor belts of each segment of the conveying apparatus are in fact constituted by a first and a second motor, indicated in FIG. 7 with the numerical references M2' and M2", which are able to activate respective parallel belt of corresponding segments of the conveying apparatus. As said detail of FIG. 7 shows, the motor M2' actuates the conveyor belts 184a and 184b of the segment T2 of the conveying line 184. In practice, it has been noted that the articles that are conveyed on the conveyor belts travelling along the outermost part of the curve reach the successive treatment unit with a certain delay relative to those that travel along the innermost part of said curves. All this causes a delay in the operation of the downstream machine, since said machines are only operated when the sensors asked with detecting the presence of useful loads to be treated by said machines sense the presence of articles on all the parallel conveyor belts of the feeding segment of said machine. According to the present invention, it is therefore advantageously possible to operate the "paired" motors destined to move respective parallel conveyor belts of the corresponding segment of the conveying apparatus, in such a way as to actuate said conveyor belts at slightly different speeds, such as to allow the conveyed articles to arrive in practically simultaneous fashion in correspondence with the downstream operative section.

Figure 3:
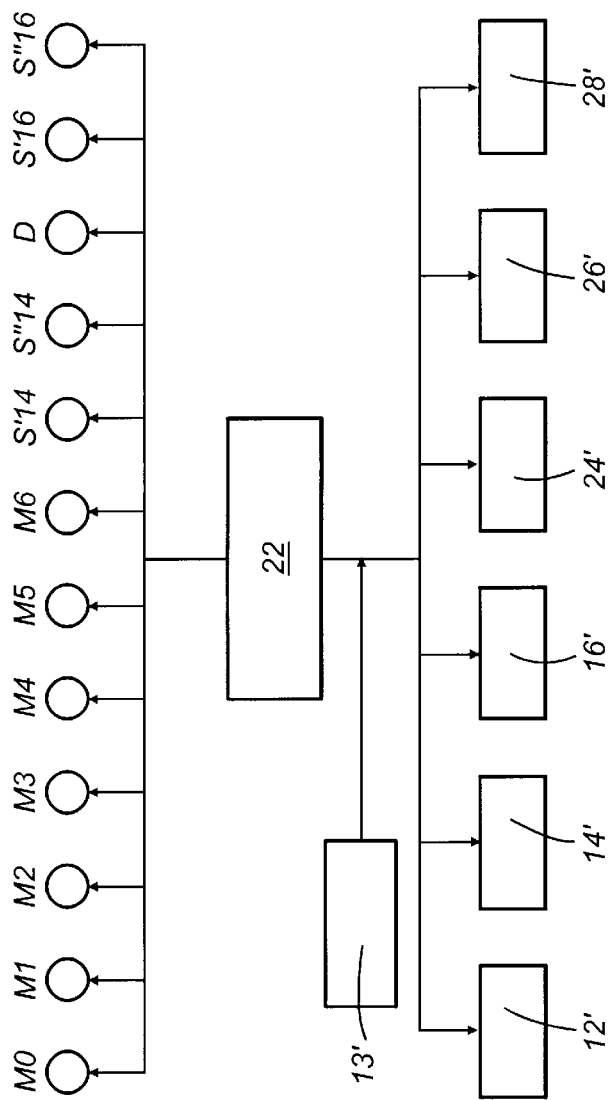
FIG. 3 shows a block diagram of the architecture of the control unit of the plant of the embodiment of FIG. 1.

As can be observed with reference to the aforesaid FIGS. 1 and 3, said upstream operative section 12 presents an electronic or local processing unit, in the form of a PLC 12' that controls its overall operation, whereas said downstream operative sections 14, 16 present a respective local electronic processing unit, also in the form of a PLC (or PC) 14', 16' which controls their overall operation. The coiling section (not shown in the accompanying drawings) of the forming machine can comprise an appropriate local control PLC (or PC) 13', different from the PLC 12' of the shearing machine.

In particular, the local control unit 12' of the upstream machine 12 comprises processor means that operate under the control of a predefined program that governs the operation, according to predefined operative sequences, of said cutting machine 12 in response to corresponding setting or input data which are provided to said processor means of the cutting machine 12. This program for controlling the shearing machine is prepared by the manufacturer of this machine. According to the present invention no specific knowledge of this software is required on the part of the operators that are involved with the design of the roll manufacturing plant.

In a similar manner, each of the local control units 14', 16' of the packaging machines 14, 16 comprises processor means that operate under the control of a predefined program that governs the operation, according to respective predefined operative sequences, of said packaging machine 14, 16 in response to corresponding setting data that are provided to said processor means of the packaging machine 14, 16. This program for controlling the shearing machine is prepared by the manufacturer of this machine. According to the present invention no specific knowledge of this software is required on the part of the operators who are involved with the design of the roll manufacturing plant.

In turn the apparatus 182, 184, 186, 20 for conveying the rolls has a respective local control unit 22 which comprises processor means operating under the control of a predefined program that governs the operation of said conveying apparatus in response to setting data input into said processor means of the conveying apparatus.

According to an advantageous aspect of the present embodiment, a central control unit 22 is provided, which has a program for determining operating parameters of the various machines of the plant, such that, starting from predefined setting data supplied to said central unit and relating to a desired operation of the plant, it provides, for the respective microprocessor means of the local control units, corresponding data for setting the operation of said upstream cutting machine 12 and of said downstream packaging machine 14, 16.

Advantageously, the electronic central processing unit 22 thus controls, through the respective local control units of the operative sections, the operation of the upstream operative section 12 and downstream operative sections 14, 16. In particular, the central control unit 22 controls the upstream section through the PLC 12' of the shearing machine or the local control PLC (not shown in the figures) of the coiling machine and the downstream sections through the PLC's 14', 16'.

Advantageously, according to the present preferred embodiment, the function as central control unit for the plant is performed by the local unit 22 which controls the conveying apparatus. This solution is particularly advantageous thanks to the fact that the operation of the conveying apparatus is not excessively complex, whereas the operation of the upstream shearing machine and of the packaging machines is in fact rather complex. The PLC or PC for controlling the conveyor therefore has the possibility of maintaining in the memory and easily run this additional program for managing the operating data of the plant. This program for their determination could in fact even be comprised in the program that manages the operation of the components of the conveying apparatus.

One could also imagine that the central control unit of the apparatus could be defined by any one of the local control PLC's of the plant. One thereby avoids the burden of a specific control unit for this function.

FIG. 3 shows how the central control unit 22 is connected to provide for controlling the operation of said conveying means directly to the control boards of the aforesaid electrical motors M0, M1, M2, M3, M4, M5, M6 and to the means for actuating the switch D of the conveying apparatus.

The electronic processing unit 22 is preferably constituted by a PLC. A PC could nonetheless also be used.

Purely by way of example, the central processing unit 22 could be composed of an electronic processor or CPU, a permanent memory ROM, a volatile memory RAM, a fixed rigid memory or hard drive, input/output circuits housed on appropriate cards within the containment chassis C, as shown in FIG. 4. The aforesaid FIG. 4 further shows how means are provided for entering data and commands, preferably in the form of an input keyboard, designated with the numeric reference T in FIG. 4, and means are provided for displaying the data for the operator, which are in the form of a display designated with the numeric reference V in said FIG. 5.

As shown in FIG. 1, the reference numbers S'14 and S"14 serve schematically to represent and indicate the sensors, preferably in the form of optical sensors, which signal the reaching, by the rolls accumulating on the conveyor belt at the inlet of the respective packaging machine, of the minimum and maximum load towards the first downstream operative section 14, whilst the reference numbers S'16 and S"16 serve schematically to represent and indicate the sensors, preferably in the form of optical sensors, which define the minimum and maximum load on the conveying means towards the second downstream operative section 16. These sensors are, as shown in FIG. 3, directly connected to the central control unit 22.

In the present plant each of said downstream operative sections 14, 16 sends said articles to at least a respective successive machine for sacking said articles 24, 26, by means of respective conveying means 25, 27. Said successive work sections of said articles 24, 26 are in the form of machines for sacking said packs into corresponding cases or sacks, in which said packs of rolls are readied in groups of packs having appropriately predefined number and configuration.

Each successive operative section 24, 26 comprises a corresponding electronic processing unit, in the form of a PLC (or a PC) 24', 26' having processor means that operate under the control of an appropriate program which controls the start of predetermined operative sequences for the operation of this machine.

Advantageously, said central processing unit 22 of the conveying apparatus controls, sending setting data to the local control unit 24', 26', the operation of each successive sacking section 24, 26.

According to the present plant embodiment, each of said successive operative sections 24, 26 sends—through conveyors 29, 31—said sacks to a section for the palpitation of the sacks on an appropriate transport support, indicated with the generic reference 28 in FIG. 1, in which preferably a robot unit operates.

Said terminal operative section 28 comprises a corresponding electronic processing unit, in the form of a PLC (or a PC) 28' having processor means that operate under the control of an appropriate program which controls the start of predetermined operative sequences for the operation of this machine.

Said central processing unit 22 controls, through the corresponding control unit 28', the operation of said terminal section 28.

As shown in FIG. 1, a line could also be provided which skips the sacking sections 24, 26 to supply the packs directly on the palpitation section 28.

As shown schematically in FIG. 1, means 30, 32 for conveying the treated articles are provided directly between each downstream section 14, 16 and said terminal operative section 28.

The packaging machines, available on the market, present, in relation to each of said formats, a maximum working rate which can differ for each respective format. Similarly, the upstream shearing machine in relation to the type of roll to be produced destined to a respective pack format has a respective maximum working rate.

Hence, if the format of the pack to be obtained is changed, a new working rate must be set for each packaging machine and for the shearing machine 12. This speed is preferably computed in rolls used by the packaging machine or produced by the shearing machine per minute of work.

Similarly, said sacking and palliating machines or sections have a different operating rate according to the set format.

Figure 5:
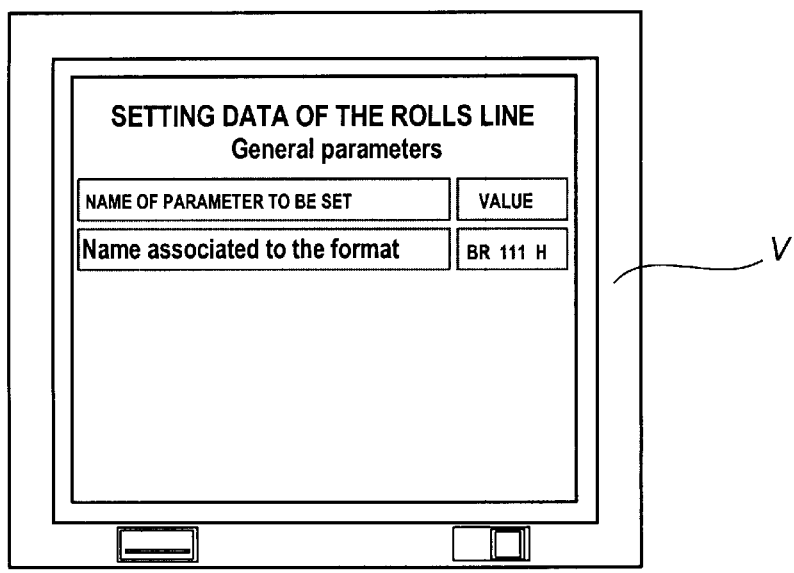
FIG. 5 shows a preferred embodiment of a screen for setting the operation as it appears on the display of the central control unit of the plant according to the present preferred embodiment.

According to a particularly advantageous aspect, in order to determine the initial operation of the plant, or upon each format change, the type of format to be produced is set through a keyboard on the control unit 22, for instance by means of the screen shown in FIG. 5.

The control unit 22 then determines, for each work section, the hypothetical working rate for the operation of that section. This hypothetical operating rate of the section corresponds to the maximum operating rate the individual section can reach to provide the selected product format.

Each machine or work section already has this maximum rate data available for each respective product format. For the control unit it is therefore easy to retrieve, one the format is set, this maximum rate data item from an appropriate memory.

At this point the central control unit 22 compares, in relation to each work section, the hypothetical working rate with the working rate of the sections that receive or provide the articles thereto, until it determines a critical section defined as that section in which the hypothetical working rate, for that format, is the lowest relative to the corresponding hypothetical working rates of the other sections.

By way of example, in reference to the first embodiment shown, the central processing unit 22 compares the maximum working rate for the set format of the shearing machine to the sum of the maximum working rates for that format of the two downstream packaging machines. The "weakest" section among them for that type of format is thus defined.

In practice, it would be useless to set the section 12 to the maximum working rate, if the two downstream machines 14, 16 are not able, as a whole, to handle such a quantity of product. Conversely, it is not advisable to set the working rate of the downstream machines 14, 16 to the maximum value, if the upstream machine 12 is not able to feed such a quantity of product to said downstream machines 14, 16.

Similarly, it is not opportune for the section 14 to feed in the unit of time, to the successive unit 24, a large quantity of product, if the unit 24 is not able, for that format, to handle such a quantity of product: in this case a command for stopping said preceding section 14 would be generated. Nor is it opportune, in opposite fashion, for said section 24 to be set to operate at a higher rate than that of the preceding section 14, with the consequent rapid exhaustion of the products fed to said machine 24 and the consequent stop of the latter section.

From the comparisons between the maximum hypothetical rates that the different sections could maintain, one can determine the critical section or sections defining the maximum rate limit for the plant or for the individual work line.

The central unit 22 then determines the actual or effective working rates of the plant sections in such a way that these rates are lower than the respective maximum rates and are not such as to feed or obtain, in correspondence with the critical section, a quantity of articles exceeding the quantity corresponding to the maximum working rate achievable in this section for that format.

The highest yield can obviously be obtained by setting the working rate of the critical section to the maximum possible working rate for that format and setting the working rates of the other sections so that they are such as to feed or obtain, in correspondence with the critical section, a quantity of articles equal to the quantity corresponding to the maximum working rate achievable in this critical section for said set format.

For instance, the rate limit for the line constituted by the section 14 and section 24 could be constituted by the speed of the packaging machine. The working rate of the sacking machine 24 could thus be set correspondingly lower than the respective maximum rate which this section 24 could maintain for that format, and equal to the maximum rate value of said packaging machine 14. Moreover, the working rate of the shearing machine 12 could be set to a value that is lower than its maximum value for that format, so that the packaging machines 14, 16 are globally able to absorb the quantity of articles produced with no risk of being supplied with excess products.

The present inventor has intuited that, in order to obtain high productive yields, it is necessary to provide for feeding the products along the line at a speed that is as uniform as possible and such as to minimize the occurrence of events (for instance product jams or lack of replenishment) that cause interruption in the advance of the articles.

The flow of articles from the upstream section to the downstream sections thus takes place, under normal conditions, at a homogeneous and substantially constant rate, such as to minimize the risk of activation of the minimum filling and maximum filling sensors for the downstream work section. Stoppages in the plant, or in parts thereof, are thus minimized.

A product feeding that is as continuous and homogeneous as possible is obtained, at a rate that is not excessive, which allows also to overcome the risk of upsetting the product with the corresponding interruptions of its feeding along the line.

After determining the actual operating rates of the various sections, the central processing unit 22 then transmits to the plant sections, through appropriate transmission means (not shown expressly in the accompanying figures), preferably in the form of connecting cables to the respective PLC's, a signal to command said sections at the actual computed working rate. The control unit 22 directly determines and commands also the operation of the motors of the conveying apparatus at a suitable speed to maintain a flow of articles between the actual operative section of the plant that is as homogeneous as possible.

In this way, the working rate of the various sections cannot be programmed in an inappropriate and excessive manner by the operators.

An uniform conveyance is thereby assured, thanks to an appropriate selection of the working rate of the plant system, avoiding excessively high rates, minimizing the risk of upsetting and accumulating the articles with the corresponding interruptions.

When the format of the product to be produced with the present plant is changed, the new rates of the various plant sections are set by the central unit in an extremely rapid manner, without any additional workload for assigned personnel.

Operating in a different way, it would also be possible to set the working rate of the downstream packaging machines 14, 16 and send the data corresponding to these set rates to the central unit 22, through suitable transmission means, preferably in the form of electrical connection cables of the central unit 22 with the local control unit 14', 16' of said first and second downstream operative sections 14, 16. This setting can be done manually through a local keyboard by assigned operators.

Figure 6:
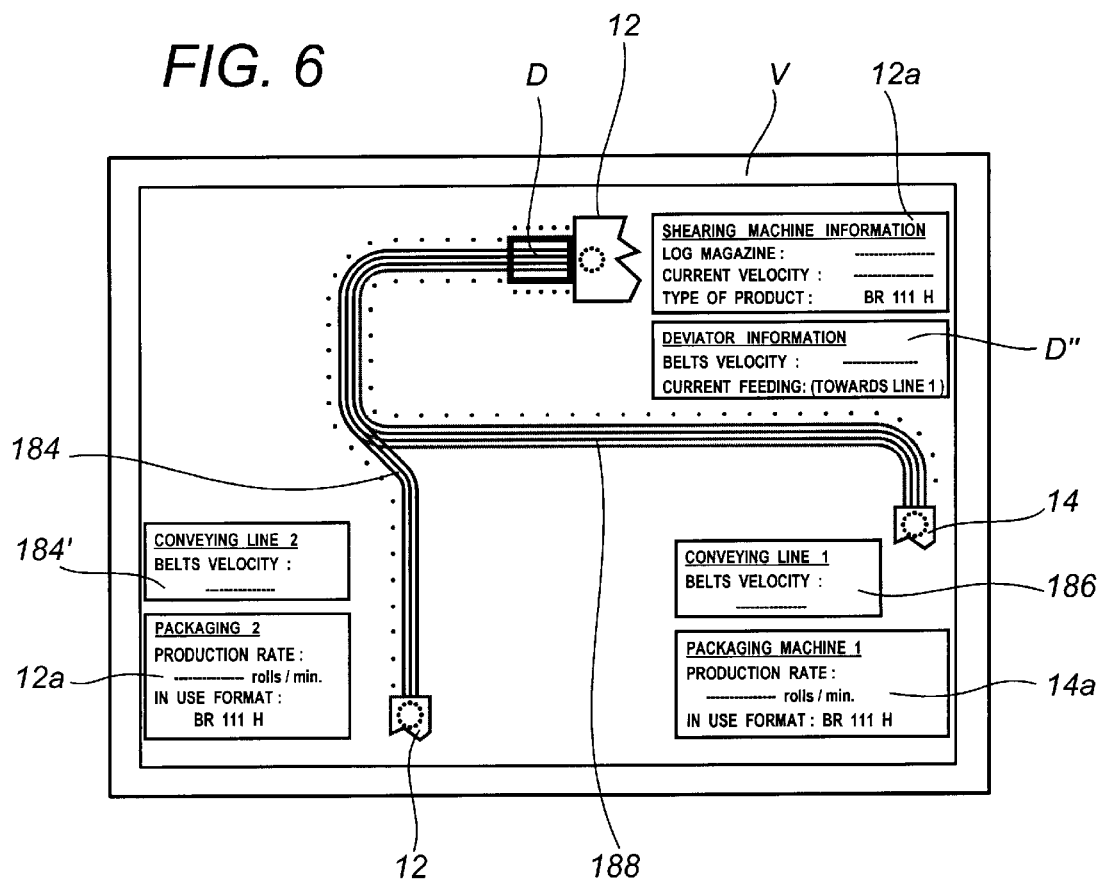
FIG. 6 shows a preferred screen illustrating the operating status of the plant according to the present preferred embodiment.

The status or operating condition of the plant can be illustrated by an appropriate screen on the display V of the control unit 22. For instance said screen could be like the one shown in FIG. 6 which, however, shows only a part of the present plant related to the shearing machine 12, the switch D, the conveying line 184, which feeds a first packaging machine and a corresponding conveying line 186, which feeds a second packaging machine 14. As shown, in this screen of FIG. 6, windows are present which display the operating parameters of the respective work sections. In greater detail, the window 12a displays some operating parameters of the shearing machine 12, in particular its actual operating rate, the window D" shows information about the operating status of the switch D, the window 12a shows operating parameters of the packaging machine 12, in particular its actual operating rate, and the window 14a shows operating parameters of the packaging machine 14, in particular its actual operating rate. Moreover, the windows 184' and 186' show operating parameters of the conveying lines 184 and 186, in particular their actual operating rate.

The present central control unit also allows to reset the working parameters of the plant sections to adapt the system to an emergency situation which has changed the operation of some machines in the plant.

Hence, according to the procedure, when the central unit 22 detects a change in an operating parameter of at least one of the sections of the plant, in particular when an event occurs that determines the operation of that section to stop, it verifies the operating status of the other sections of the plant, and it determines a procedure for rearranging the operation of the plant, in accordance to the operating status of the other sections of the plant.

In accordance with a first rearranging procedure, if the magazine with the pieces or elongated coils has a number of pieces below a predefined level, in case of interruption in the feeding of articles to one of said downstream work sections 14, 16 without decreasing the working rate of the upstream machine 12, operation is continued until the magazine is fully emptied.

In this case, if the operation of one of said downstream work sections 14, 16 is interrupted due to an emergency, through appropriate sensors the load condition of said upstream section is measured and if it is below a predetermined level, the articles are deviated onto the conveying means of the operative section 14, 16 not in emergency conditions and the cutting operations of the residual logs are allowed to be completed.

In this way, if the log magazine for feeding said shearing machine 12 is near exhaustion and, in particular, the quantity of products formed by the cutting of said residual logs can be housed on the conveying means, the inopportune interruption of the operation of the shearing machine is avoided.

One could also provide for having the apparatus to operate in such a way that the first segment of the conveying means 18, which is immediately downstream of said upstream operative section 12, is maintained as free as possible for a length equal to or multiple of the length of the individual group of articles, to allow in case of stoppage of one or both downstream machines, for an easy emptying of the upstream operative section 12.

Moreover, in case of interruption, due to an emergency, of the operation of one of said downstream work sections 14, 16, if the other section of the plant is able to increase its operating rate, in accordance with a second procedure for rearranging the system, without decreasing the working rate of the upstream machine 12, the working rate of the other second downstream operative section is increased and, by means of the switch 20, the articles still upstream of said switch are deviated onto the conveying means of the operative section 14, 16 that is not under emergency conditions.

According to a further procedure for rearranging the system, it could also be provided, in case of interruption due to an emergency of the operation of one of said downstream work sections 14, 16, if the other downstream section is able to increase the operating rate, for the working rate of this other downstream operative machine to be increased, deviating the articles onto the conveying means of the operative section 14, 16, not under emergency conditions, to absorb part of the quantity of articles which are no longer processed by the machine undergoing an emergency, and for the working rate of the upstream machine 12 to be decreased correspondingly.

If, however, the interruption of the operation of the downstream machine is such as to prolong for a time exceeding a pre-set time, according to a third rearrangement procedure, after the upstream shearing machine 12 has cut all the logs that were undergoing work, the cutting of the log destined to the downstream machine in emergency conditions is inhibited, preventing the feeding to the cutting blade of logs destined to produce rolls for the machine in the stopped condition. For this purpose, supplying the cutting blade with the log destined to said machine in emergency conditions is avoided. In this way one avoids interrupting the operation of the cutting blade and the related drawbacks which such interruptions would entail for its complex actuating mechanism. In this case one exploits the capability of the deviating means D to send simultaneously articles on both conveying lines 184, 182 for the two packaging machines.

In accordance with a fourth rearrangement procedure, if a downstream section 14 or 16 is under missing load conditions, the conveying velocity of the corresponding conveying apparatus 184 or 186 is to be increased. The velocity of the belts in the various conveying segments T1, T2, T3 or T4, T5, T6 being set to grow progressively, with the velocity increasing from the conveying section immediately downstream of the shearing machine to the successive belts.

For the sake of greater security, in order to perform such rearrangement of the operation of the plant, the data relating to the value of the actual velocities present in the various sections are in any case obtained by the central unit directly from the respective local control PLC's of the respective work sections.

In a preferred manner, the operation of the present apparatus for forming and packaging the rolls is such as to cause the articles to be conveyed, starting from said upstream operative section 12, in trains or groups of articles. Each train or group of articles is defined by the rolls that are cut from a single log or, possibly, by a predefined number of such rolls. If the rolls have particularly reduced length, one avoids, thanks to the possibility for the end faces of such rolls to bear against the roll that follows or precedes, the risk that said rolls may be upset.

As shown in FIG. 3, it is also conceivable for said central control unit to receive operating data and controls the operation of the coiling machine 13 of the forming machine through its local control unit 13'.

The present central processing unit 22 advantageously allows, through the display means V, to place the operating parameters relating to the plant in a single point, available to a single operator who can oversee the operation of the entire plant and assess its compliance with requirements.

In particular, said displayed data relating to each of the operative section illustrate at least one of the following operative aspects: maximum treatment rate of the respective section, instantaneous treatment rate of the respective section, minimum treatment rate of the respective section, pack format, sack format, quantities produced.

Through said display means, it is also possible to display data referring to characteristics of the articles (rolls) treated (for instance geometric dimensions, weight, type of paper of the rolls).

Through said display means V it is also possible to show data relating to any stops of the operative sections or of the conveying apparatus. Such displayed data relating to any stops of the machines or of the conveying apparatus pertaining to at least one of the following aspects: trend of the stops over time, number and duration of the stops within predefined time intervals, cause of the stops.

Advantageously, said central processing unit 22 allows to print the displayed data. One could also provide for sending said displayed data to the display units of the production managers.

In order to determine accurately the state of the plant, the central processing unit 22 of the present embodiment can thus be provided with data relating to the following aspects: length of log or elongated coil (for instance equal to 2650 mm), set or predetermined quantity per unit of time for the apparatus for re-coiling or forming the elongated coils of the upstream section for forming the articles (in number of logs/minute), type of paper (for instance pure or recycled cellulose), type of roll (for instance single or double layer paper), type of roll core (for instance, cardboard tube), quantity of rips per roll (it indirectly provides the weight of the roll) or weight of the roll, type of glue and quantity used to attach the paper to the core, quantity of elongated coils present in the forming machine magazine, number of channels of the shearing machine, type of shearing machine (manufacturer and type), length of the belts of the conveying apparatus, number of motors present in the conveying apparatus, position of the maximum load and minimum load sensors along the conveying apparatus, diameter and length of the roll, format of the packs (number of rolls per pack), format of the sacks (number of packs per sack), maximum rate for the type of format and for the type of packaging or sacking machine, times for replacing the coils of film for the production of the packs and sacks in each machine and at what time interval from the previous replacement.

One could also conceive taking into account, in order to set a maximum rate of the work machines and of the conveying apparatus, the material that constitutes said rolls and possibly other parameters (for instance the weight of the rolls or the number of rips), in order to avoid damaging the conveyed product.

According to the embodiment shown in FIG. 1, the shearing machine 12 has four conveying channels and the packaging machines 14, 16 have four incoming channels. The switch 20 in this case has four incoming channels and eight outgoing channels. One could also conceive a plant of the type shown with shearing and packaging machines that have a number of outgoing channels other than four. By way of example, one could have a shearing machine with three outgoing channels, two packaging machines with four incoming channels and a switch that therefore has three inlets of the rolls and eight outlets thereof, or a shearing machine with two outgoing channels, two packaging machines with two incoming channels and a switch that therefore has two inlets of the rolls and four outlets thereof. One could also conceive having a shearing machine with three outgoing channels, two packaging machines with three incoming channels and a switch that therefore has three inlets of the rolls and six outlets thereof, or a shearing machine with four outgoing channels, and two packaging machines, respectively, with two and four incoming channels and corresponding switch. According to another example, one could have a shearing machine with four channels and three packaging machines with four channels.

Figure 8:
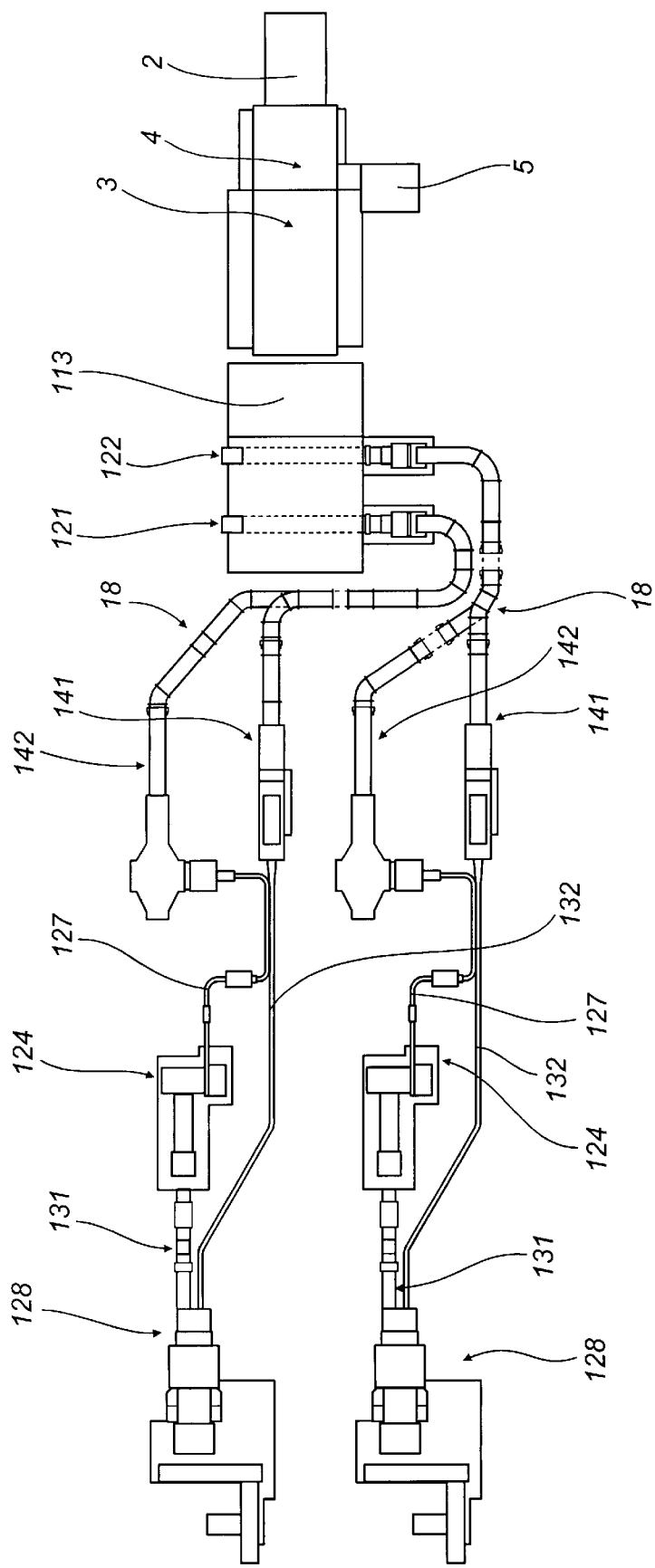
FIG. 8 shows a schematic view of a plant in accordance with a second preferred embodiment of the present invention.

FIG. 8 shows a second embodiment of plant, in particular for obtaining articles in the form of paper rolls or the like.

This second embodiment presents a roll forming machine which, in known fashion, comprises, schematically, a series of sections that provide the logs to be cut into rolls, starting from a main loading coil, of considerable size, obtained directly from the paper mill. Said sections comprise an initial coil loading section 2, which generally supports at least a first and a second of said loading coils to allow for a continuous feeding of the apparatus for producing rolls and which unwinds the paper strip from the feeding coil and for transferring it to a successive section 4 for embossing the paper strip. Downstream of the embossing section, a re-coiling section 3, which receives the core tubes from an appropriate section 5 for their forming, winds on these elongated tubes a quantity of paper having a diameter corresponding to that of the rolls to be produced, obtaining the logs or elongated coils, which are sent to a successive section 113 for storing said logs or elongated coils and, thence, to the sections for the actual shearing of the rolls from said logs. In this apparatus is present at least a PLC for controlling the re-coiling machine and a PLC for controlling the area where the logs are cut into rolls. Said local control units not being expressly shown in FIG. 8.

In this second preferred embodiment the apparatus for forming articles has in particular a first and a second cutting sections 121, 122. Said cutting units send the articles to respective machines for packaging the articles downstream therefrom. In particular, a first and a second packaging machine 141, 142 can be provided, equipped with respective PLC, for each cutting section 121, 122. Downstream from said packaging sections are further provided sacking machines or sections 124, equipped with respective PLC. Each of said machines 124 sends the sacks to a respective palpitation machine or section 128, equipped with respective PLC, whence the palliated products can be sent to a storage warehouse.

The numerical references 127 and 132 indicated conveying lines for the packs towards the sacking machine and for said packs towards the palpitation section. The numerical reference 131 instead indicates the conveyance of the sacks from the respective sacking machine to said palpitation section.

As shown in FIG. 8, the reference 18 globally indicates the conveying apparatus, which has its own controlling PLC that defines, in a preferred manner, also the general control unit of the plant.

As shown according to this embodiment of forming machine, the cutting sections are fed with elongated coils coming from a single coil magazine 113 fed by a single re-coiling section 3.

In accordance with an advantageous aspect of this second preferred embodiment, when an event that causes the operation of one of the cutting sections 121, 122 of the plant to stop is detected, the central control unit verifies the operating state of the other cutting section of the plant, and determines, acting through the PLC that controls said other cutting section, a corresponding procedure for rearranging the operation of the plant.

In particular, this rearranging procedure provides that, if the other cutting section of the plant is able to increase the operating rate, the working rate of this other cutting section is increased, in order to absorb at least partially the load of coils, present in the log magazine 131, which are no longer processed by the other cutting section in stopped condition. One thereby avoids having to stop the re-coiling section.

In practice, in this plant embodiment, when one of the shearing section is stopped, a first rearranging procedure is possible, which provides for increasing the working rate of the other one in such a way as to absorb the entire quantity of logs that is not produced by the other.

A second rearranging procedure can also be followed, in which, when one of the shearing sections stops, the working rate of the other is increased in such a way that a part of the quantity of logs not used by the other cutting section in stopped condition is absorbed, allowing the number of logs to grow in the shared magazine provided between the coiling machine and the shearing sections. All, preferably, without slowing the coiling machine.

According to a further aspect it is possible to use and electronically controlled scale which measures the weight of the treated rolls. The signal corresponding to such weight can advantageously be used by the central control unit to operate on the re-coiler machine of the roll forming machine, through the PLC that controls the re-coiling section, in order to adjust the weight of the roll to the weight or characteristics set for that format.

The invention thus conceived can be subject to numerous modifications and variations, without thereby departing from the scope of the inventive concept. Moreover, all components can be replaced by technically equivalent elements. It must particularly be understood that other sizes or parameters different from the format of the pack to be produced could be considered as starting data for determining the operation of the present plant.

What is claimed:

1. A method for operating a plant for producing, conveying and packaging articles, said plant comprising the following operative sections:

at least one apparatus for forming articles positioned upstream, at least one machine for packaging said articles in respective packs positioned downstream, and an apparatus for continuously conveying said articles between said forming apparatus and said packaging machine;

wherein, through a program for determining operating parameters of the plant of a central control unit of the plant, starting from predefined setting data, determining operating parameters of the sections of the plant, said parameters are provided to the local control units of the operative sections of the plant, and wherein in order to determine by said program of the central unit the operation of the plant:

a type of format to be produced is set; and then by said program of the central unit, determining, for each operative section, a hypothetical working rate corresponding to a maximum operating rate in relation to said type of format;

comparing, for each operative section, the hypothetical working rate to the hypothetical working rate of at least one section that receives the articles therefrom, to determine at least one critical section defined as at least one section in which the hypothetical working rate, for said type of format, is lowest relative to the corresponding hypothetical working rates of the other sections and hence an actual working rate of each section of the plant is determined in such a way that each said actual working rate is lower than the respective maximum rates and are such as to feed or obtain, in correspondence with the critical section, a quantity of articles equal to the quantity corresponding to the maximum working rate achievable in this section for that format.

2. A method as claimed in claim 1, wherein said forming apparatus comprises a cutting section positioned upstream, which is able to cut the articles in the form of rolls from respective elongated coils.

3. A method as claimed in claim 2, wherein said forming apparatus comprises a piece magazine for storing the elongated coils, situated upstream of the cutting section.

4. A method as claimed in claim 1, wherein said plant comprises at least a further section downstream of the packaging machine, said further section downstream of the packaging machine is a machine for sacking the packs of articles in respective containment sacks.

5. A method as claimed in claim 1, wherein said plant comprises at least a further section downstream of the packaging machine, said further section downstream of the packaging machine is a machine for palletizing the packs or sacks on respective transport pallets.

6. A method as claimed in claim 1, wherein for each upstream section is provided at least a first and a second downstream section whereto the pieces coming from the upstream section are fed.

7. A method as claimed in claim 1, wherein said format is the format of the pack which is defined by the type of roll and by the number and disposition of the rolls in said pack.

8. A method as claimed in claim 1, wherein the actual working rates of the plant sections are determined in such a way that said rates are such as to feed or obtain, in correspondence with the critical section, a quantity of articles equal to or substantially equal to the quantity corresponding to the maximum working rate achievable in this critical section for said set format.

9. A method as claimed in claim 1, wherein the setting procedure is repeated at each format change.

10. A method for operating a plant for producing, conveying and packaging articles, said plant comprising the following operative sections:

an apparatus for forming articles positioned upstream, a machine for packaging said articles in respective packs positioned downstream, and an apparatus for conveying said articles which transfers said articles between said forming apparatus and said packaging machine, said apparatus or forming articles being a machine for cutting rolls from respective elongated coils and comprising a magazine holding the elongated coils, wherein, when a change is detected in an operating parameter of at least one of the sections of the plant, the operating state of the other sections of the plant is verified, and a procedure for rearranging the operation of the plant is determined, according to said operating state of the other sections of the plant, and wherein the rearranging procedure provides, when the magazine holding the pieces or elongated coils has a number of pieces below a predefined level, continuing the operation until the magazine is completely emptied and when the magazine holding the pieces or elongated coils has a number of pieces above the predefined level, stopping the operation, when an interruption of the feeding of articles to said downstream work section occurs, without decreasing the working rate of the upstream machine.

11. A method for operating a plant for producing, conveying and packaging articles, said plant comprising the following operative sections:

at least one apparatus for forming articles positioned upstream, at least first and second machines for packaging said articles in respective packs positioned downstream, and an apparatus for conveying said articles which transfers said articles between said forming apparatus and said first and second packaging machines and which is situated downstream of the forming apparatus and upstream of said first and second packaging machines, wherein said apparatus for forming articles is a machine for cutting rolls from respective elongated coils and comprises a magazine holding the elongated coils, wherein when a change is detected in an operating parameter of at least one of the sections of the plant, the operating state of the other sections of the plant is verified, and a procedure for rearranging the operation of the plant is determined, according to said operating state of the other sections of the plant, and wherein the rearranging procedure provides, measuring a load condition of the upstream section and when the load condition is below a predetermined level, deviating the articles onto the apparatus for conveying of the operative section not in emergency conditions and the cutting operations of residual logs in the magazine are allowed to be completed and when the load condition is above the predetermined level, stopping the cutting operation, when an interruption of the feeding of articles to one of said downstream work sections is detected.

12. A method for operating a plant for producing, conveying and packaging articles, said plant comprising the following operative sections:

at least one apparatus for forming articles positioned upstream, a plurality of machines for packaging said articles in respective packs positioned downstream, and an apparatus for conveying said articles which transfers said articles between said forming apparatus and said plural packaging machines, said apparatus for forming articles being a machine for cutting rolls from respective elongated coils and comprising a magazine holding the respective elongated coils, wherein, when a change is detected in an operating parameter of at least one section of the plant, the operating state of other sections of the plant is verified, and a procedure for rearranging the operation of the plant is determined, according to said operating state of the other sections of the plant, and wherein the rearranging procedure provides that when an interruption of the feeding of articles to one of said downstream work sections occurs, inhibiting the cutting of the respective elongated coils destined to said one of the plural downstream sections under conditions of stopped operation, and continuing cutting of other respective elongated coils destined to others of said plural downstream work sections without decreasing the working rate of the upstream machine.

13. A method for operating a plant for producing, conveying and packaging articles, said plant comprising the following operative sections:

at least one apparatus for forming articles positioned upstream, at least first and second machines for packaging said articles in respective packs positioned downstream, and an apparatus for conveying said articles which transfers said articles between said forming apparatus and said first and second packaging machines and which is situated downstream of the forming apparatus and upstream of said first and second packaging machines, wherein when a change is detected in an operating parameter of at least one section of the plant, the operating state of other sections of the plant is verified, and a procedure for rearranging the operation of the plant is determined, according to said operating state of the other sections of the plant, and wherein the rearranging procedure provides, increasing the conveying velocity of the conveying apparatus, when the detected change is a downstream section under conditions of missing load and maintaining the conveying velocity when no change in an operating parameter is detected.

14. A method for operating a plant for producing, conveying and packaging articles, said plant comprising the following operative sections:

at least an apparatus for forming articles positioned upstream, at least a machine for packaging said articles in respective packs positioned downstream, and an apparatus for conveying said articles which transfers said articles between said forming apparatus and said packaging machine and which is situated downstream of the forming apparatus and upstream of the packaging machine; said apparatus for forming articles being a machine for cutting rolls from respective logs or elongated coils and comprising a magazine holding the logs or the elongated coils;

wherein when a change is detected in an operating parameter of at least one section of the plant, the operating state of other sections of the plant is verified, and a procedure for rearranging the operation of the plant is determined, according to said operating state of the other sections of the plant; and wherein the rearranging procedure provides that when a downstream interruption is detected, if the magazine holding the pieces or elongated coils has sensing a number of pieces in the magazine, and between articles measuring a load condition of the apparatus for conveying, moans is moacurod and when a quantity of products formed by the cutting of residual logs sensed in the magazine can be housed on the apparatus for conveying the cutting operations of the residual logs are allowed to be completed, so that the residual loss are stored on the conveyor and when the quantity of products formed by the cutting of said residual loss cannot be housed on the apparatus for conveying, the cutting or operations of the residual loss is stopped.

* * * * *